United States Patent
Xu et al.

(10) Patent No.: US 12,353,734 B2
(45) Date of Patent: Jul. 8, 2025

(54) USING OBJECT PROPERTIES FOR FACILITATING OBJECT STORAGE

(71) Applicant: Alibaba Group Holding Limited, Grand Cayman (KY)

(72) Inventors: Peng Xu, Milpitas, CA (US); Yikang Xu, Redmond, WA (US); Rui Wang, Redmond, WA (US); Yu Du, Hangzhou (CN)

(73) Assignee: Alibaba Group Holding Limited (KY)

( * ) Notice: Subject to any disclaimer, the term of this patent is extended or adjusted under 35 U.S.C. 154(b) by 88 days.

(21) Appl. No.: 18/274,313

(22) PCT Filed: Feb. 10, 2021

(86) PCT No.: PCT/CN2021/076445
§ 371 (c)(1),
(2) Date: Jul. 26, 2023

(87) PCT Pub. No.: WO2022/170544
PCT Pub. Date: Aug. 18, 2022

(65) Prior Publication Data
US 2024/0086091 A1   Mar. 14, 2024

(51) Int. Cl.
*G06F 3/06* (2006.01)
(52) U.S. Cl.
CPC .......... *G06F 3/0631* (2013.01); *G06F 3/0668* (2013.01)
(58) Field of Classification Search
CPC ....................................................... G06F 3/06
See application file for complete search history.

(56) References Cited

U.S. PATENT DOCUMENTS

| | | | |
|---|---|---|---|
| 9,588,976 B1 * | 3/2017 | Riel | G06F 3/0643 |
| 10,176,212 B1 * | 1/2019 | Prohofsky | G06F 16/2365 |
| 10,503,406 B2 * | 12/2019 | Kang | G06F 3/0605 |
| 10,572,159 B1 * | 2/2020 | Thrane | G06F 3/0649 |
| 11,061,594 B1 * | 7/2021 | Wang | G06F 3/0689 |
| 2009/0282084 A1 | 11/2009 | Milby | |
| 2014/0207827 A1 | 7/2014 | Huang et al. | |
| 2018/0007134 A1 * | 1/2018 | Guim Bernat | G06F 3/0617 |

FOREIGN PATENT DOCUMENTS

| | | |
|---|---|---|
| CN | 101038590 A | 9/2007 |
| CN | 105893531 A | 8/2016 |

OTHER PUBLICATIONS

International Search Report mailed Nov. 10, 2021, from PCT/CN2021/076445, 3 pages.
Written Opinion mailed Nov. 10, 2021, from PCT/CN2021/076445, 4 pages.

* cited by examiner

*Primary Examiner* — Khoa D Doan
(74) *Attorney, Agent, or Firm* — Lee & Hayes, P.C.

(57) ABSTRACT

A storage engine may obtain one or more object access properties of an object to be received, and determine a type of storage device that is suitable or desirable for storing the object from among different types of storage devices based at least in part on the one or more object access properties of the object to be received. In response to determining the type of storage device, the storage engine may allocate a storage device of such type for the object. The storage engine may then receive the object, and store the object into the allocated storage device.

16 Claims, 3 Drawing Sheets

USING OBJECT PROPERTIES FOR FACILITATING OBJECT STORAGE

CROSS-REFERENCE TO RELATED PATENT APPLICATIONS

This application claims priority to and is a continuation of PCT Patent Application No. PCT/CN2021/076445 filed on 10 Feb. 2021 and entitled "Using Object Properties for Facilitating Object Storage," which is incorporated herein by reference in its entirety.

BACKGROUND

Object storage (which is also known as object-based storage) is a computer data storage architecture that manages and manipulates data as distinct units, called objects. This type of storage architecture is different from other types of storage architectures, such as a file storage which manages and manipulates data using a file hierarchy, or block storage which manages and manipulates data as logical blocks within data sectors or tracks, etc. In object storage, each object may typically include its own data, metadata, and a globally unique identifier (ID). In view of the unprecedented volume of data generated daily in the Internet, this object storage has emerged as a potential or even preferred method for data archival and storage, allowing and facilitating the management and processing of massive amounts of unstructured data, on an order of terabytes (TBs), petabytes, or even larger. Example uses of object storage may include, but are not limited to, storing photos, songs, files, etc., in cloud storages that are provided by social networks, web services, etc.

To facilitate management of objects in cloud storage and to provide flexibility to users for storing and loading data, object semantics are developed and used for updating an object, and allowing users to access records of the object through a globally unique identifier, a data offset, and a data length of the object. Currently, the object storage, however, simply adopts a single and common way to support and manage a variety of objects that have large differences in data sizes and data accessing patterns. Such single and common way of support and management incurs a management overhead, and leads to a waste of storage and processing resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
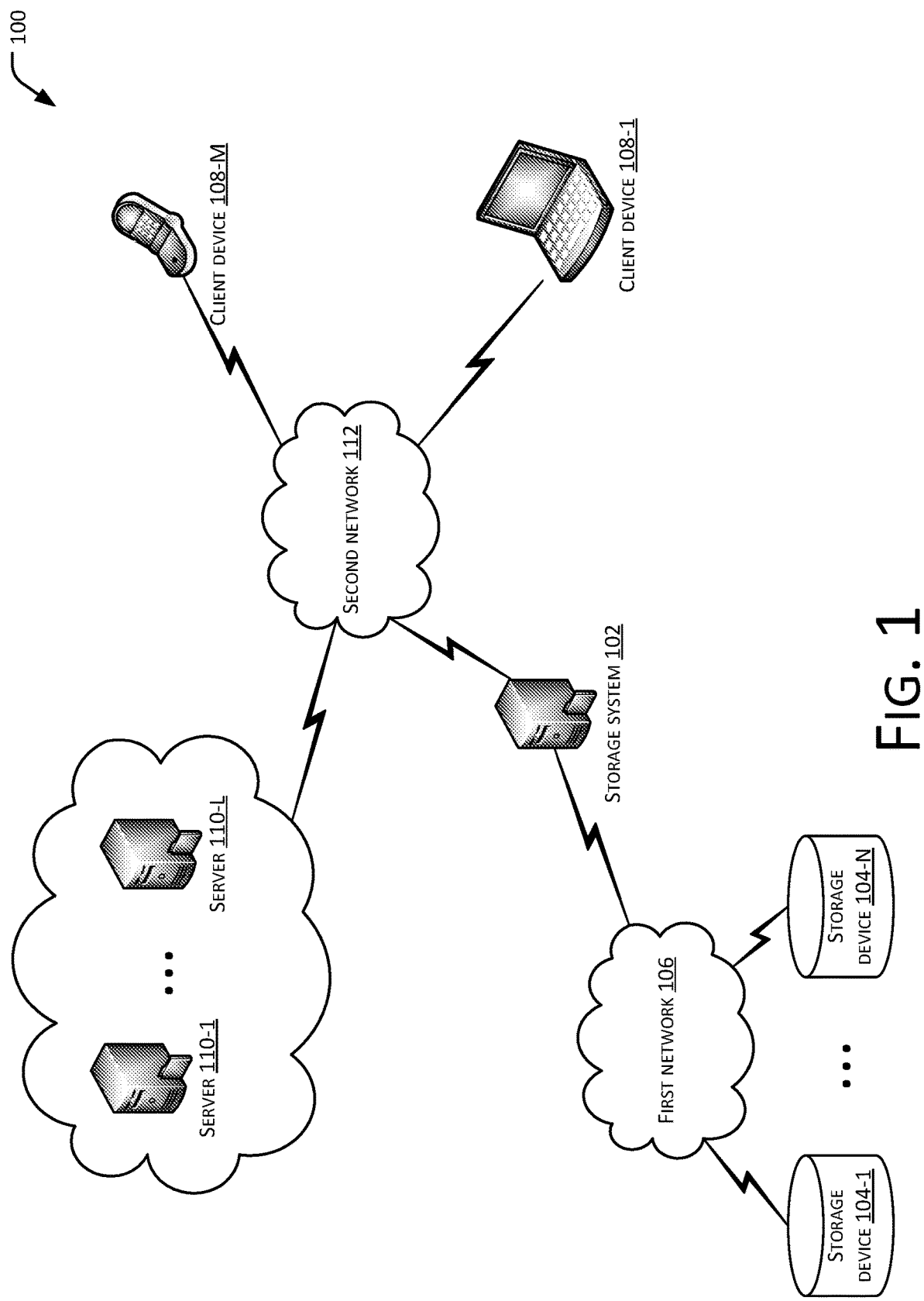
FIG. 1 illustrates an example environment in which a storage system may be used.

As described above, existing object storage technologies adopt a single and common way to support and manage a variety of objects that have large differences in data sizes and data accessing patterns, without any data format limitation for the objects, and without taking into account data accessing patterns of the objects. Due to a lack of knowledge of the data accessing patterns of the objects, storage systems simply mix and store objects of varied access frequencies together, and do not differentiate the objects to achieve reliable storage and different response times expected or desired by users. Mixing objects that have large differences in access frequencies may result in a higher write amplification caused by an internal data movement in a storage device storing the objects, because a recycle process needs to perform a garbage collection to move all valid data from an original storage portion of the storage device to a new storage location and reclaim storage spaces in the storage portion that are originally occupied by invalid data (i.e., data that is deleted or marked as deleted) by erasing or clearing the storage portion. This therefore further incurs a management overhead and a waste of storage and processing resources, leading to a poor performance of the storage systems.

This disclosure describes an example storage system. In implementations, the storage system may devise a new data format scheme that allows users to provide information about accessing properties of objects that are or are to be stored. The storage system may therefore be able to adaptively determine and allocate different types of storage devices for storing the objects according to the accessing properties of the objects to improve or optimize the efficiency of memory usage and the performance of the storage system. In implementations, the different types of storage devices may include, but are not limited to, storage devices having different response latencies, storage devices having different degrees of proximities to processors of the storage system, storage devices having different data access speeds, storage devices having different program erase cycles and/or read disturb thresholds, etc. Examples of the different types of storage devices may include, for example, a cache, a random access memory, a solid state device, and a hard drive, etc.

In implementations, accessing properties of an object may include, but are not limited to, an average amount of data of the object that is to be read in subsequent access requests after the object is received, a potential frequency range for receiving the subsequent access requests, a latency requirement for responding to the subsequent access requests, whether records of the object are read sequentially, or whether the object is to be modified within a predetermined time period from a current time, etc.

In implementations, the storage system may further receive object record formats of the objects, and adaptively allocate amounts of storage spaces for the objects according to the object record formats of the objects. In implementations, an object record format of an object may include, but is not limited to, a non-specific format or a fixed format. In implementations, a non-specific format of an object may enable a maximum size and a minimum size of a record of the object to be defined according to a storage specification of a storage device that stores the object. In implementations, a fixed format of an object may include information of an average physical size of the object and a variation of size of the object.

As described above, the storage system can adaptively determine and allocate different types of storage devices for different objects based on accessing properties and object record formats of the objects, and can therefore store and process the objects differentially and adaptively according to respective access needs or requirements of the objects. This not only avoids a waste of storage and processing resources, but also improves the efficiency of memory usage and the performance of the storage system.

In implementations, functions described herein to be performed by the storage system may be performed by multiple separate services or units. Moreover, although in the examples described herein, the storage system may be implemented as a combination of software and hardware implemented in an individual entity or device, in other examples, the storage system may be implemented and distributed as services provided in one or more computing devices over a network and/or in a cloud computing architecture.

The application describes multiple and varied embodiments and implementations. The following section describes an example framework that is suitable for practicing various implementations. Next, the application describes example systems, devices, and processes for implementing a storage system.

Example Environment

FIG. 1 illustrates an example environment 100 usable to implement a storage system. The environment 100 may include a storage system 102, and one or more storage devices 104-1, . . . , 104-N (which are collectively called as storage devices 104), where N is an integer greater than or equal to one. The storage system 102 and the plurality of storage devices 104 may communicate data with one another via a first network 106. In this example, the one or more storage devices 104 are said to be included in the storage system 102. In other instances, the one or more storage devices 104 may be peripheral and accessible to the storage system 102.

In this example, the storage system 102 is described to be an individual entity or device. In other instances, the storage system 102 may be located or included in one or more client devices 108-1, . . . , 108-M (which are collectively called as client devices 108), and/or one or more servers 110-1, . . . , 110-L (which are collectively called as servers 110), where M and L are integers greater than or equal to one. In implementations, the storage system 102 may be included in a data center or cloud computing infrastructure including a plurality of servers 110.

In implementations, in an event that the storage system 102 is not included in the one or more client devices 108, the storage system 102 may be connected to the one or more client devices 108 via a second network 112, and may be configured to communicate data with the one or more client devices 108 via the second network 112.

In implementations, each of the one or more client devices 108 and the one or more servers 110 may be implemented as any of a variety of computing devices, and may include, but is not limited to, a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

In implementations, the first network 106 may be a data communication network including one or more data communication lines or channels that connect the storage system 102 (such as a memory of the storage system 102) and the one or more storage devices 104 through wireless and/or wired connections. Examples of wired connections may include an electrical carrier connection (for example, a communication cable, a computer or communication bus such as a serial bus, a PCIe bus or lane, etc.), an optical carrier connection (such as an optical fiber connection, etc.). Wireless connections may include, for example, a WiFi connection, other radio frequency connections (e.g., Bluetooth®, etc.), etc.

In implementations, the second network 112 may be a wireless or a wired network, or a combination thereof. The network 106 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANS). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

Example Storage System

Figure 2:
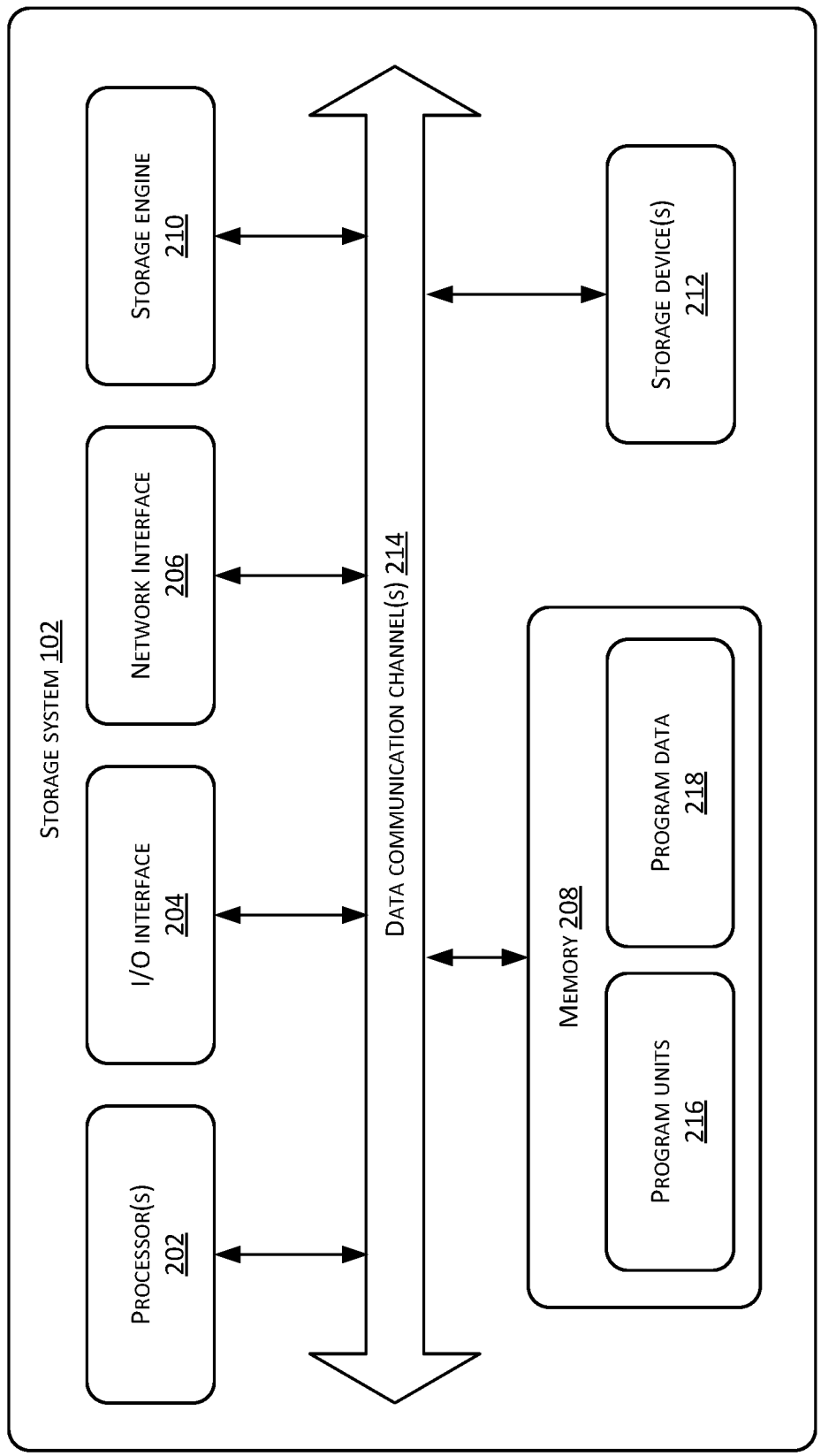
FIG. 2 illustrates the example storage system in more detail.

FIG. 2 illustrates the storage system 102 in more detail. In implementations, the storage system 102 may include, but is not limited to, one or more processors 202, an input/output (I/O) interface 204, and/or a network interface 206, and memory 208. Additionally, the storage system 102 may further include a storage engine 210, one or more storage devices 212 (such as the one or more storage devices 104), and one or more data communication channels 214. In implementations, the storage engine 210 may include at least one processor (such as the processor 202) and memory (such as the memory 208).

In implementations, some of the functions of the storage system 102 may be implemented using hardware, for example, an ASIC (i.e., Application-Specific Integrated Circuit), a FPGA (i.e., Field-Programmable Gate Array), and/or other hardware. In implementations, the storage system 102 may include one or more computing devices such as the computing devices 108 as shown in FIG. 1, or may be included in one or more computing devices.

In implementations, the processors 202 may be configured to execute instructions that are stored in the memory 208, and/or received from the I/O interface 204, the network interface 206, and/or the storage engine 210. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 208 may include computer readable media (or processor readable media) in a form of volatile memory, such as Random Access Memory (RAM) and/or non-volatile memory, such as read only memory (ROM) or flash RAM. The memory 208 is an example of computer readable media (or processor readable media).

The computer readable media (or processor readable media) may include a volatile or non-volatile type, a removable or non-removable media, which may achieve storage of information using any method or technology. The information may include a computer readable instruction (or a processor readable instruction), a data structure, a program module or other data. Examples of computer readable media (or processor readable media) include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media (or processor readable media) does not include any transitory media, such as modulated data signals and carrier waves.

In implementations, the one or more data communication channels 214 may include at least one or more data communication lines or channels that connect the storage system 102 (such as the memory 208 of the storage system 102) and the one or more storage devices 212 through wireless and/or wired connections. Examples of wired connections may include an electrical carrier connection (for example, a communication cable, a computer or communication bus such as a serial bus, a PCIe bus or lane, etc.), an optical carrier connection (such as an optical fiber connection, etc.). Wireless connections may include, for example, a WiFi connection, other radio frequency connections (e.g., Bluetooth®, etc.), etc.

In implementations, the one or more storage devices 212 (or the one or more storage devices 104) may include, but are not limited to, different types of storage devices, such as storage devices having different response latencies, storage devices having different degrees of proximities to processors of the storage system, storage devices having different data access speeds, storage devices having different program erase cycles and/or read disturb thresholds, etc.

By way of example and not limitation, the one or more storage devices 212 (or the one or more storage devices 104) may be implemented as any of a variety of different types of storage devices having and providing storage capabilities, and may include, but are not limited to, primary storage, secondary storage, and tertiary storage, etc. In implementations, the primary storage may include, but is not limited to, a cache memory, a main memory (for example, random access memory (RAM), such as dynamic random access memory (DRAM), etc.), DCPMM (i.e., a data center persistent memory module, such as Optane™ persistent memory), NVMe (i.e., non-volatile memory express), etc. In implementations, the secondary storage may include, but is not limited to, a flash memory or solid state device (SSD), a hybrid hard drive (HHD), a hard disk drive (HDD), etc. The flash memory or solid state device may include, for example, a SLC (i.e., single-level cell) flash memory, a MLC (i.e., multi-level cell) flash memory (such as TLC (i.e., triple-level cell) flash memory, QLC (i.e., quad-level cell) flash memory, PLC (i.e., penta-level cell) flash memory, for example), etc. In implementations, the tertiary storage may include, but is not limited to, external memory or removable storage media, such as an external flash drive or SSD, an external HHD, an external HDD, etc.

Although in this example, only hardware components are described in the storage system 102, in other instances, the storage system 102 may further include other hardware components and/or other software components such as program units 216 to execute instructions stored in the memory 208 for performing various operations, and program data 218 that stores application data and data of tasks processed by the storage system 102. In this example, the one or more storage devices 212 are described to be included in the storage system 102. In other instances, the one or more storage devices 212 may be associated with the storage system 102, such as being peripheral and accessible to the storage system 102. In implementations, the one or more storage devices 212 may be controlled and/or managed by the storage system 102.

Example Methods

Figure 3:
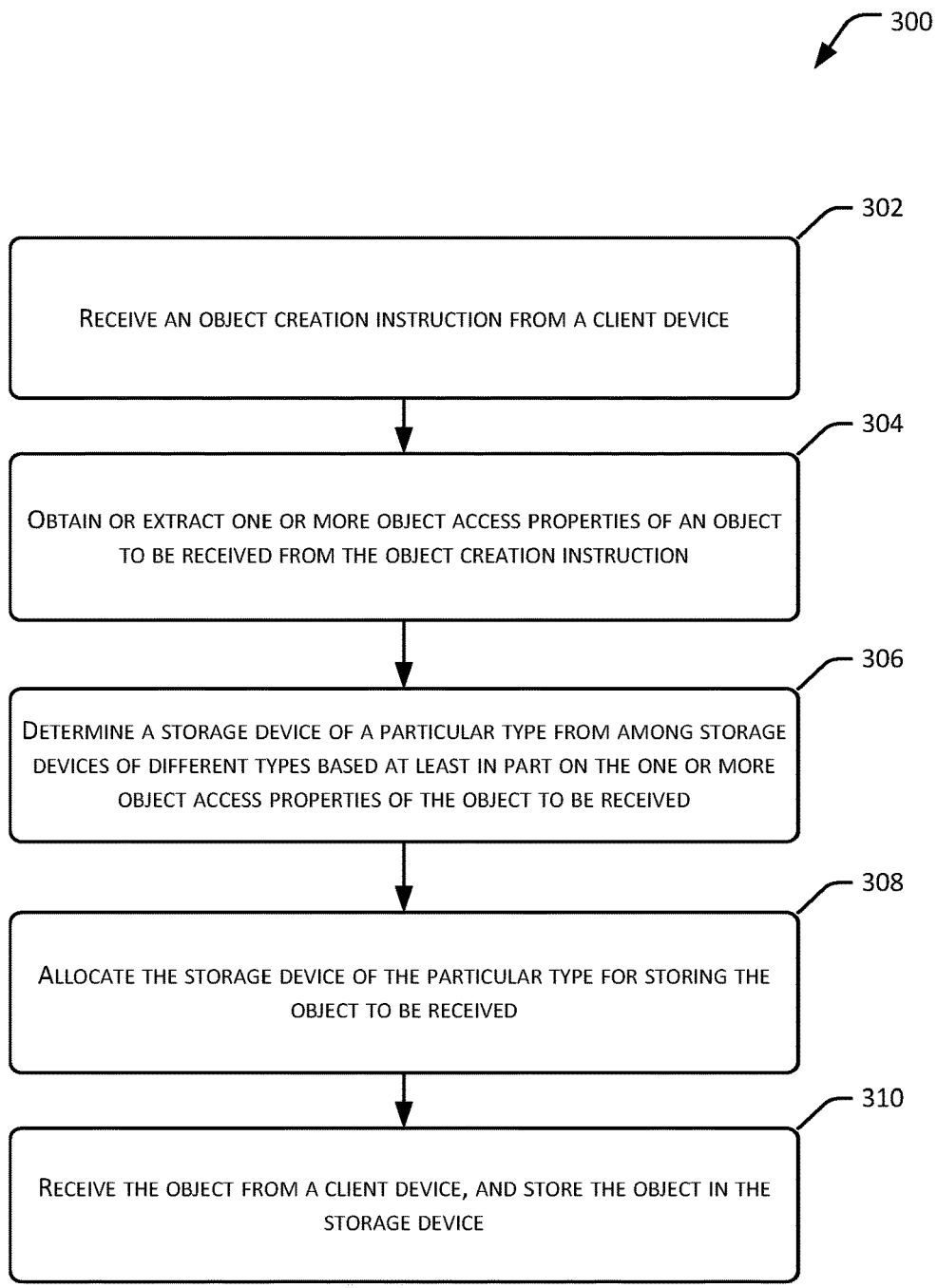
FIG. 3 illustrates an example data storage method.

FIG. 3 illustrates a schematic diagram depicting an example data storage method. The method of FIG. 3 may, but need not, be implemented in the environment of FIG. 1, and using the system of FIG. 2. For ease of explanation, method 300 is described with reference to FIGS. 1 and 2. However, the method 300 may alternatively be implemented in other environments and/or using other systems.

The method 300 is described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 3, at block 302, the storage system 102 or the storage engine 210 may receive an object creation instruction from a client device.

In implementations, the storage engine 210 (or the storage system 102) may receive an object creation instruction or request from a client device (such as the client device 108) of a user. In implementations, the storage engine 210 may provide a user interface or an online form including a plurality of parameter fields for a plurality of object access properties to the client device 108. In this case, the user of the client device 108 may input parameter values for one or more parameter fields of the plurality of parameter fields, and the client device 108 may generate an object creation instruction or request, include the parameter values for the one or more parameter fields in the object creation instruction or request, and send the object creation instruction or request to the storage engine 210. In implementations, the plurality of parameter fields may be defined in advance, for example, by system maintenance or management personnel, etc., of the storage engine 210 manually. Additionally or alternatively, the object creation instruction or request may take a form of an object creation command, such as a RPC (remote procedure call) command, etc. The storage engine 210 may allow the user of the client device 108 to provide parameter values for one or more parameter fields of the plurality of parameter fields through the object creation command.

In implementations, predefined parameter values for each of the plurality of parameter fields may be configured in advance by the storage engine 210 (or the system maintenance or management personnel, etc., of the storage engine 210). The user of the client device 108 may select or enter respective predefined parameter values for the one or more parameter fields of the plurality of parameter fields, which are then sent to the storage engine 210 in a form of the object creation instruction. In implementations, for any other parameter fields that do not receive a parameter value from the user of the client device 108, default parameter values may be configured by the storage engine 210 for these parameter fields. Additionally or alternatively, the storage engine 210 may also accept user-defined parameter values for the plurality of parameter fields, and the user-defined parameter values may be inputted by the user of the client device 108 through the object creation instruction, such as inputted through the user interface or the object creation command, etc.

In implementations, the plurality of parameter fields may include, but are not limited to, a record read size field, an append prepare field, a sequential read field, an access latency field, and an access frequency field, etc. In implementations, the plurality of parameter fields may correspond to a plurality of object access properties of an object that is to be received. By way of example and not limitation, the plurality of parameter fields, such as the record read size field, the append prepare field, the sequential read field, the access latency field, and the access frequency field as exemplified above, may separately correspond to a plurality of object access properties of the object to be received, namely, an amount (such as an average amount, a median amount, etc.) of data of the object that is to be read in subsequent access requests for the object after the object is received or created, whether the object is to be modified within a predetermined time period from a current time, whether records of the object are read sequentially, a latency requirement for responding to the subsequent access requests for the object, and a potential frequency range for receiving the subsequent access requests for the object. Apparently, the plurality of parameter fields may include more or fewer parameter fields than those described above, and the plurality of object access properties may also include more or fewer properties than those described above.

In implementations, the record read size field may allow the user to input an amount (such as an average amount, a median amount, etc.) of data of the object that is to be read in subsequent access requests for the object after the object is received or created, for example, a parameter value for the record read size field may include a zero value (which may indicate an unspecified value), or a value indicating the number of bytes of data of the object that is normally or commonly read (such as an average number or a median number of bytes, etc.). Alternatively, the parameter value for the record read size field may include a first value (which may indicate a low amount of data of the object that is normally or commonly read, such as less than a predefined amount threshold), or a second value (which may indicate a high amount of data of the object that is normally or commonly read, such as greater than or equal to the predefined amount threshold). In some instance, the parameter value for the record read size field may further include a third value (which may indicate an unspecified value), for example.

In implementations, the append prepare field may allow the user to input whether the object is to be modified within a predetermined time period from a current time. In implementations, the predetermined time period may be defined in advance by the maintenance or management personnel of the storage engine 210 or by the user of the client device 108. In implementations, a parameter value for the append prepare field may include a first value (such as "Null", "N/A", or "00", etc.) representing that no append prepare information is provided, a second value (such as "Yes", "Y", or "01", etc.) representing that the object is to be deleted within the predetermined time period, or a third value (such as "No", "N", or "10", etc.) representing that the object is not to be deleted within the predetermined time period.

In implementations, the sequential read field may allow the user to input whether certain records of the object are read sequentially. In implementations, a parameter value for the sequential read field may include a first value (such as "Null", "N/A", or "00", etc.) representing that no sequential read information is provided, a second value (such as Yes", "Y", or "01", etc.) representing that the records of the object are read sequentially, or a third value (such as "No", "N", or "10", etc.) representing that the records of the object are not read sequentially.

In implementations, the access latency field may allow the user to input a latency requirement for responding to the subsequent access requests for the object. For example, a parameter value for the access latency field may include a first value (such as "Null", "N/A", or "00", etc.) representing that no latency information is provided, a second value (such as "High", "H", or "01", etc.) representing that a high or large latency is acceptable (such as an acceptable or allowable time of latency of accessing the object being greater than or equal to a first latency threshold, e.g., 1 millisecond, 10 milliseconds, etc., that is definable or configurable by the storage engine 210 or the user of the client device 108 from which the object is received), a third value (such as "Medium", "M", or "10", etc.) representing a typical or medium latency (for example, an acceptable or allowable time of latency being within a predefined range, such as a range of 10 microseconds to 1 millisecond, etc., that is definable or configurable by the storage engine 210 or the user of the client device 108 from which the object is received), or a fourth value (such as "Low" "L", or "11", etc.) representing a low or small latency (such as an acceptable or allowable time of latency of accessing the object being less than or equal to a second latency threshold, e.g., 1 microsecond, 5 microseconds, etc., that is definable or configurable by the storage engine 210 or the user of the client device 108 from which the object is received).

In implementations, the access frequency field may allow the user to input a potential frequency range for receiving the subsequent access requests for the object. For example, a parameter value for the access latency field may include a first value (such as "000", etc.) representing that no access frequency information is provided, a second value (such as "001", etc.) representing that the object is a cold write and cold read object, a third value (such as "010", etc.) representing that the object is a cold write and hot read object, a fourth value (such as "011", etc.) representing that the object is a hot write and cold read object, or a fifth value (such as "110", etc.) representing that the object is a hot write and hot read object.

In implementations, semantics of objects may be set up in advance in the storage engine 210, and may include different operations associated with object, which include, but are not limited to, appending (or adding), reading, sealing (i.e., making undeletable), and deleting. In implementations, an object may be considered or defined as a "hot" or "cold" write object and/or a "hot" or "cold" read object (such as based on an accessing pattern of the object.

By way of example and not limitation, an object is a hot write object if data of the object will be deleted within a first predefined time period after the object is written or created. Alternatively, an object is a cold write object if data of the object will be valid for at least a second predefined time period. In implementations, the first predefined time period and the second predefined time period may be defined by the storage engine 210 (or the system maintenance or management personnel of the storage engine 210, etc.) and/or a user of a client device that provides the object to the storage engine 210. In implementations, the first predefined time period may or may not be the same as the second predefined time period. In an event that the first predefined time period is not the same as the second predefined time period, any object that is deleted after a certain time period that falls between the first predefined time period and the second predefined time period may be treated as not defined. Such object may be open to be strategically treated by the storage engine 210 according to storage conditions (such as available capacities, etc.) of different types of storage devices that are manageable and/or accessible by the storage engine 210. Additionally or alternatively, this object may be preliminarily treated as a possibly hot write object or a possibly cold write object depending on whether the certain time period is closer to the first predefined time period or the second predefined time period.

In implementations, an object is a hot read object if data of the object will be read frequently, such as at a rate greater than or equal to a first predefined frequency. Alternatively, an object is a cold read object if data of the object will not be read frequently, such as at a rate less than a second predefined frequency. In implementations, the first predefined frequency and the second predefined frequency may be defined by the storage engine 210 (or the system maintenance or management personnel of the storage engine 210, etc.) and/or a user of a client device that provides the object to the storage engine 210. In implementations, the first predefined frequency may or may not be the same as the second predefined frequency. In an event that the first predefined frequency is not the same as the second predefined frequency, any object having a read frequency that falls between the first predefined frequency and the second predefined frequency may be treated as not defined. Such object having the read frequency that falls between the first predefined frequency and the second predefined frequency may be open to be strategically treated by the storage engine 210 according to storage conditions (such as available capacities, etc.) of different types of storage devices that are manageable and/or accessible by the storage engine 210. Additionally or alternatively, this object may be preliminarily treated as a possibly cold read object or a possibly hot read object depending on whether the read frequency is closer to the first predefined frequency or the second predefined frequency.

Additionally or alternatively, the object creation instruction may include a format field for an object record format. In implementations, the object record format may include one of a non-specific format or a fixed format. In implementations, a value or index for the format field may include "0" for the non-specific format, or "1" for the fixed format. In implementations, if the object creation instruction does not include an object record format, the storage engine 210 may use a non-specific format as a default format. In implementations, an object with a non-specific format means that no specific format is assigned or given to the object, and in particular, no information about data sizes of records of the object is given or known in advance.

In implementations, a non-specific format for an object may enable a maximum (physical) size and a minimum (physical) size of records of the object to be defined according to a storage specification or capacity of a storage device in which the records of the object are to be stored. In other words, if an object has the non-specific format (i.e., no specific format is given or provided for the object by the user of the client device 108), a maximum size and a minimum size of records of the object are defined according to a storage specification or capacity of a storage device in which the records of the object are to be stored. In implementations, to support a variety of different physical sizes of records of an object, mapping information of each record of the object may include or store a physical location (or physical address) and a physical size of the respective record on a storage device, which are stored in a certain data structure (such as a mapping table, for example) of a system memory (such as the memory 208) associated with the storage engine 210 or the storage system 102 for record indexing, searching and/or mapping. In implementations, a bit width of a physical location (or physical address) of a record of an object is a fixed value, which is determined by a storage capacity of a storage device storing the record, and a physical size of the record varies from a system minimum alignment granularity (such as 128 bytes (B), for example) to a system maximum length (such as 8 megabytes (MB), for example) according to a storage specification of the storage device. In implementations, if the storage device is a block storage device with a size of a logical block as a LB size (such as 4 kilobytes (KB), for example), a size field (or length field) for physical sizes of records of an object needs to cover ((system maximum length/LB size)+1). For example, if the system maximum length is 8 MB and the LB size is 4 KB, 8 MB/4 KB+1=11 bits are needed for a size field of each mapping entry.

In implementations, a fixed format for an object may include an object record size mean and an object record variation associated with the object. For example, the object record size mean may represent a mean or average of physical sizes of records of the object, and the object record variation may represent a variation or variance of physical sizes of records of the object.

In implementations, given an object record format (which may be the non-specific format or the fixed format) of an object, the storage engine 210 may adaptively determine or adjust a size of a data structure (such as a mapping table, for example) that is used for storing mapping information of records of the object in the system memory (such as the memory 208) associated with the storage engine 210 (or the storage system 102) based on the object record format of the object. For example, if an object has a fixed format with an object record size mean as 1024 KB and an object record variation as zero, 1024 KB/4 KB+1=9 bits are needed for a size field of each mapping entry for records of the object, if a block storage device with a size of a logical block of 4 KB is used.

Alternatively, in implementations, given an object record format (which may be the non-specific format or the fixed format) of an object, the storage engine 210 may adaptively determine or optimize a size of a data structure (such as a mapping table, for example) that is used for storing mapping information of records of the object in the system memory (such as the memory 208) associated with the storage engine

210 (or the storage system 102) by referring to a format value or index (i.e., which object record format) of the object rather than storing exact physical sizes of records of the object or an exact physical size of the object (or how many data sectors the object or each record of the object may take or occupy) in the system memory associated with the storage engine 210 (or the storage system 102).

At block 304, the storage system 102 or the storage engine 210 may obtain or extract one or more object access properties of an object to be received from the object creation instruction.

In implementations, in response to receiving the object creation instruction or request, the storage engine 210 may obtain or extract one or more object access properties of objects to be received from the object creation instruction. In implementations, the storage engine 210 may extract parameter values for the one or more object access properties from the object creation instruction (for example, the parameter values inputted for the one or more parameter fields through the user interface or included in the object creation command as described in the above example).

At block 306, the storage system 102 or the storage engine 210 may determine a storage device of a particular type from among storage devices of different types based at least in part on the one or more object access properties of the object to be received.

In implementations, the storage engine 210 may determine a storage device of a particular type from among storage devices of different types based at least in part on the one or more object access properties of the object to be received and/or the object record format.

In implementations, depending on which one or more object access properties of the object are received or known, the storage engine 210 may determine or recommend a suitable type of storage device for storing the object from among a variety of different types of storage devices that are manageable and/or accessible by the storage engine 210.

In implementations, the one or more object access properties of the object to be received may include a latency requirement for responding to subsequent access requests. In implementations, the storage engine 210 may allocate a type of storage device that satisfies the latency requirement from among a plurality of different types of storage devices. By way of example and not limitation, the storage engine 210 may allocate a SLC (single-level cell) solid state device for storing the object to be received in response to the latency requirement belonging to a first latency range, or allocate a QLC (quad-level cell) solid state device for storing the object to be received in response to the latency requirement belonging to a third latency range, etc.

In implementations, the one or more object access properties of the object to be received additionally or alternatively include an average amount of data of the object that is to be read in subsequent access requests. In implementations, the storage engine 210 may determine whether the average amount of data of the object that is to be read in the subsequent access requests is greater than or equal to a predefined read threshold, and a predefined number of individual sizes of a plurality of records of the object stored in the storage device are less than a predefined size threshold. In implementations, the storage engine 210 may trigger a data merging operation on the plurality of records of the object in response to determining whether the average amount of data of the object that is to be read in the subsequent access requests is greater than or equal to the predefined read threshold, and the predefined number of individual sizes of the plurality of records of the object stored in the storage device are less than the predefined size threshold.

In implementations, the one or more object access properties of the object to be received may additionally or alternatively include whether multiple records of the object are read sequentially. In implementations, the storage engine 210 may determine whether the multiple records of the object are read sequentially. In implementations, in response to receiving a request for fetching a record of the multiple records of the object from a client device (such as the client device 108), the storage engine 210 may fetch the record, and further pre-fetch one or more records that follows after the record from the storage device.

In implementations, the one or more object access properties of the object to be received may additionally or alternatively include a latency requirement for responding to subsequent access requests and whether the object is to be modified within a predetermined time period from a current time. In implementations, the storage engine 210 may determine whether the latency requirement for responding to the subsequent access requests indicates a latency that is longer than a predefined latency threshold being acceptable, and whether the object is indicated to be modified within the predetermined time period from the current time. In implementations, the storage engine 210 may postpone storing the plurality of records of the object in the storage device by a predefined amount of time from a time of receiving the object from the client device.

In implementations, the one or more object access properties of the object to be received may additionally or alternatively include information about an access frequency or an access frequency range of the object. In implementations, the storage engine 210 may allocate a type of storage device to the object based on the information about the access frequency or the access frequency range of the object.

By way of example and not limitation, if a storage device stores or includes a large number of QoS (Quality of Service) objects that require to have a low or short latency or a high response speed, the storage engine 210 may perform load balancing on the storage device, and move some of these QoS objects to one or more other storage devices.

For another example, if the record read size field is set, for example, with the second value as described in the above example (which represents that a high amount of data of the object that is normally or commonly read), and records of the object are small in size, the storage engine 210 may combine or merge the records to form one or more large records to optimize or facilitate reading of the object.

For another example, if the append prepare field is set, for example, with the second value as described in the above example (i.e., which represents that the object is to be deleted within the predetermined time period) and the access latency field is set, for example, as the second value as described in the above example (i.e., which represents that a high or large latency is acceptable), the storage engine 210 may postpone an append request, and wait for a next append request of the object.

For another example, if the sequential read field is set, for example, with the second value (i.e., which represents that the records of the object are read sequentially), the storage engine 210 may pre-fetch one or more following records of the object when a user requests to read a record of the object, the one or more following records being records located immediately after the record that is requested by the user for reading.

For another example, if the access latency of the object is known (i.e., the access latency field is set), the storage engine 210 may place the object to a storage device of a particular type according to the access latency requirement of the object. For example, the storage engine 210 may determine and allocate a storage device having a short or low latency (or a high access speed) for an object having a short or low access latency requirement, and determine and allocate a storage device having a long or high latency (or a relatively low access speed) for an object having a long or high access latency requirement. For example, the storage engine 210 may place a high QoS object (i.e., an object with a short or low access latency requirement) in a primary storage (e.g., RAM, DCPMM (such as Optane™ memory), etc.) or a secondary storage (such as a SLC flash memory, etc.), and place a low QoS object (i.e., an object with a long or high access latency requirement) in a secondary storage (such as a QLC flash memory which has an access speed that is lower than a SLC flash memory, etc.) or even a tertiary storage (such as an external flash drive or SSD, etc.).

For another example, if the access frequency of the object is known (i.e., the access frequency field is set), the storage engine 210 may also devise a recycle policy for the object accordingly. For example, as hot write objects will be deleted soon (i.e., within a predetermined time period, for example), the storage system 102 or the storage engine 210 may not need to recycle these hot write objects. For another example, as a cold write object will remain in the storage system 102 for a long period of time (e.g., longer than a period of time predefined by the storage system 102), the storage engine 210 may combine or merge records of the cold write object to form one or more larger records to obtain a comparatively better write amplification, and to further save memory for storing corresponding mapping information. Furthermore, as hot read objects normally require a relatively high quality of service, the storage engine 210 may place or store the hot read objects in one or more storage devices of types that have a better QoS (i.e., a higher access speed and/or a shorter latency) and a higher RDC (read disturb count) threshold. Similarly, the storage engine 210 may also devise a wear-levelling policy based on the access latency of the object accordingly.

At block 308, the storage system 102 or the storage engine 210 may allocate the storage device of the particular type for storing the object to be received.

At block 310, the storage system 102 or the storage engine 210 may receive the object from a client device, and store the object in the storage device.

In implementations, after determining a particular type of storage device to which the object is to be stored, the storage engine 210 may allocate the storage device of the particular type for storing the object to be received. In implementations, the storage engine 210 may initially allocate or reserve a certain or minimum amount of storage spaces by default. In implementations, the storage engine 210 may receive the object (such as records of the object) from the client device.

In implementations, the storage engine 210 may adaptively adjust (increase or decrease) the amount of storage spaces allocated for the object accordingly based at least in part on changes in demand for the object (for example, a change in an accessing pattern of the object) and/or the availability of storage resources of the storage device of the particular type and one or more storage devices of the same type.

Additionally or alternatively, in some instances, the storage engine 210 may monitor the accessing pattern of the object, and may move the object from the original storage device of the particular type to a storage device of another type based at least on changes in demand for the object (for example, a change in an accessing pattern of the object) and/or the availability of storage resources of the storage device of the particular type and one or more storage devices of the particular type. For example, the storage engine 210 may detect that an access frequency of the object has changed (for example, from hot read to cold read) after 5 pm daily. In this case, the storage engine 210 may or may not move the object from an original storage device having a higher access speed to another storage device having a lower access speed after 5 pm daily to make room for other objects that have a high access frequency after 5 pm, for example.

Any of the acts of any of the methods described herein may be implemented at least partially by a processor or other electronic device based on instructions that are stored on one or more computer-readable media. By way of example and not limitation, any of the acts of any of the methods described herein may be implemented under control of one or more processors configured with executable instructions that may be stored on one or more computer-readable media.

Conclusion

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more processors of a storage engine, the method comprising: obtaining one or more object access properties of an object to be received; determining a storage device of a particular type from among storage devices of different types based at least in part on the one or more object access properties of the object to be received; and allocating the storage device of the particular type for storing the object to be received.

Clause 2: The method of Clause 1, further comprising receiving an object creation instruction from a client device, the object creation instruction comprising the one or more object access properties of the object to be received.

Clause 3: The method of Clause 2, wherein the object creation instruction further comprises an object record format.

Clause 4: The method of Clause 3, wherein the object record format comprises one of a non-specific format or a fixed format, the non-specific format enabling a maximum size and a minimum size of a record of the object to be defined according to a storage specification of the storage device of the particular type, and the fixed format including information of an average physical size of the object and a variation of size of the object.

Clause 5: The method of Clause 1, wherein the storage devices of the different types comprise a cache, a random access memory, a solid state device, and a hard drive.

Clause 6: The method of Clause 1, wherein the one or more object access properties of the object to be received comprise at least one of: an average amount of data of the object that is to be read in subsequent access requests after the object is received, a potential frequency range for receiving the subsequent access requests, a latency requirement for responding to the subsequent access requests, whether records of the object are read sequentially, or whether the object is to be modified within a predetermined time period from a current time.

Clause 7: The method of Clause 1, further comprising: receiving the object from a client device, the object comprising a plurality of records; and storing the plurality of records of the object in the storage device.

Clause 8: The method of Clause 7, wherein the one or more object access properties of the object to be received comprise an average amount of data of the object that is to be read in subsequent access requests, and the method further comprises: determining whether the average amount of data of the object that is to be read in the subsequent access requests is greater than or equal to a predefined read threshold, and a predefined number of individual sizes of the plurality of records of the object stored in the storage device are less than a predefined size threshold; and triggering a data merging operation on the plurality of records of the object in response to determining whether the average amount of data of the object that is to be read in the subsequent access requests is greater than or equal to the predefined read threshold, and the predefined number of individual sizes of the plurality of records of the object stored in the storage device are less than the predefined size threshold.

Clause 9: The method of Clause 7, wherein the one or more object access properties of the object to be received comprise whether the plurality of records of the object are read sequentially, and the method further comprises: determining whether the plurality of records of the object are read sequentially; and in response to receiving a request for fetching a record of the plurality of the records of the object from a client device, fetching the record and further pre-fetching one or more records that follows after the record from the storage device.

Clause 10: The method of Clause 7, wherein the one or more object access properties of the object to be received comprise a latency requirement for responding to subsequent access requests and whether the object is to be modified within a predetermined time period from a current time, and the method further comprises: determining whether the latency requirement for responding to the subsequent access requests indicates a latency that is longer than a predefined latency threshold being acceptable, and whether the object is indicated to be modified within the predetermined time period from the current time; and postponing the storing of the plurality of records of the object in the storage device by a predefined amount of time from a time of receiving the object from the client device.

Clause 11: The method of Clause 7, wherein the one or more object access properties of the object to be received comprise a latency requirement for responding to subsequent access requests, and allocating the storage device of the particular type for storing the object to be received comprises: allocating a SLC (single-level cell) solid state device for storing the object to be received in response to the latency requirement belonging to a first latency range; or allocating a QLC (quad-level cell) solid state device for storing the object to be received in response to the latency requirement belonging to a third latency range.

Clause 12: One or more processor readable media storing executable instructions that, when executed by one or more processors of a storage engine, cause the one or more processors to perform acts comprising: obtaining one or more object access properties of an object to be received; determining a storage device of a particular type from among storage devices of different types based at least in part on the one or more object access properties of the object to be received; and allocating the storage device of the particular type for storing the object to be received.

Clause 13: The one or more processor readable media of Clause 12, the acts further comprising receiving an object creation instruction from a client device, the object creation instruction comprising the one or more object access properties of the object to be received and an object record format.

Clause 14: The one or more processor readable media of Clause 13, wherein the object record format comprises one of a non-specific format or a fixed format, the non-specific format enabling a maximum size and a minimum size of a record of the object to be defined according to a storage specification of the storage device of the particular type, and the fixed format including information of an average physical size of the object and a variation of size of the object.

Clause 15: The one or more processor readable media of Clause 12, wherein the one or more object access properties of the object to be received comprise at least one of: an average amount of data of the object that is to be read in subsequent access requests after the object is received, a potential frequency range for receiving the subsequent access requests, a latency requirement for responding to the subsequent access requests, whether records of the object are read sequentially, or whether the object is to be modified within a predetermined time period from a current time.

Clause 16: The one or more processor readable media of Clause 12, the acts further comprising: receiving the object from a client device, the object comprising a plurality of records; and storing the plurality of records of the object in the storage device.

Clause 17: The one or more processor readable media of Clause 16, wherein the one or more object access properties of the object to be received comprise an average amount of data of the object that is to be read in subsequent access requests, and the acts further comprise: determining whether the average amount of data of the object that is to be read in the subsequent access requests is greater than or equal to a predefined read threshold, and a predefined number of individual sizes of the plurality of records of the object stored in the storage device are less than a predefined size threshold; and triggering a data merging operation on the plurality of records of the object in response to determining whether the average amount of data of the object that is to be read in the subsequent access requests is greater than or equal to the predefined read threshold, and the predefined number of individual sizes of the plurality of records of the object stored in the storage device are less than the predefined size threshold.

Clause 18: The one or more processor readable media of Clause 16, wherein the one or more object access properties of the object to be received comprise whether the plurality of records of the object are read sequentially, and the acts further comprise: determining whether the plurality of records of the object are read sequentially; and in response to receiving a request for fetching a record of the plurality of the records of the object from a client device, fetching the record and further pre-fetching one or more records that follows after the record from the storage device.

Clause 19: The one or more processor readable media of Clause 16, wherein the one or more object access properties of the object to be received comprise a latency requirement for responding to subsequent access requests and whether the object is to be modified within a predetermined time period from a current time, and the acts further comprise: determining whether the latency requirement for responding to the subsequent access requests indicates a latency that is longer than a predefined latency threshold being acceptable, and whether the object is indicated to be modified within the predetermined time period from the current time; and postponing the storing of the plurality of records of the object in the storage device by a predefined amount of time from a time of receiving the object from the client device.

Clause 20: A storage engine comprising: one or more processors; and memory storing executable instructions that, when executed by the one or more processors of a storage engine, cause the one or more processors to perform acts comprising: obtaining one or more object access properties of an object to be received; determining a storage device of a particular type from among storage devices of different types based at least in part on the one or more object access properties of the object to be received; and allocating the storage device of the particular type for storing the object to be received.

What is claimed is:

1. A method implemented by one or more processors of a storage engine, the method comprising:
   obtaining one or more object access properties of an object to be received;
   determining a storage device of a particular type from among storage devices of different types based at least in part on the one or more object access properties of the object to be received;
   allocating the storage device of the particular type for storing the object to be received;
   receiving the object from a client device, the object comprising a plurality of records; and
   storing the plurality of records of the object in the storage device, wherein the one or more object access properties of the object to be received comprise whether a plurality of records of the object is read sequentially, and the method further comprises:
      determining whether the plurality of records of the object is read sequentially; and
      in response to receiving a request for fetching a record of the plurality of the records of the object from the client device, fetching the record and further prefetching one or more records that follows after the record from the storage device.

2. The method of claim 1, further comprising receiving an object creation instruction from the client device, the object creation instruction comprising the one or more object access properties of the object to be received.

3. The method of claim 2, wherein the object creation instruction further comprises an object record format.

4. The method of claim 3, wherein the object record format comprises one of a non-specific format or a fixed format, the non-specific format enabling a maximum record size and a minimum record size of the object to be defined according to a storage specification of the storage device of the particular type, and the fixed format including information of an average physical size of the object and a variation of size of the object.

5. The method of claim 1, wherein the storage devices of the different types comprise a cache, a random access memory, a solid state device, and a hard drive.

6. The method of claim 1, wherein the one or more object access properties of the object to be received comprise an amount of data of the object that is to be read in the subsequent access requests, and the method further comprises:
   determining whether the amount of data of the object that is to be read in the subsequent access requests is greater than or equal to a predefined read threshold, and a predefined number of individual sizes of the plurality of records of the object stored in the storage device are less than a predefined size threshold; and
   triggering a data merging operation on the plurality of records of the object in response to determining that the amount of data of the object that is to be read in the subsequent access requests is greater than or equal to the predefined read threshold, and the predefined number of individual sizes of the plurality of records of the object stored in the storage device are less than the predefined size threshold.

7. The method of claim 1, wherein the one or more object access properties of the object to be received comprise a latency requirement for responding to subsequent access requests and whether the object is to be modified within a predetermined time period from a current time, and the method further comprises:
   determining whether the latency requirement for responding to the subsequent access requests indicates a latency that is longer than a predefined latency threshold being acceptable, and whether the object is indicated to be modified within the predetermined time period from the current time; and
   postponing the storing of the plurality of records of the object in the storage device by a predefined amount of time from a time of receiving the object from the client device.

8. The method of claim 1, wherein allocating the storage device of the particular type for storing the object to be received comprises:
   allocating a SLC (single-levelcell) solid state device for storing the object to be received in response to a latency requirement belonging to a first latency range; or
   allocating a QLC (quad-levelcell) solid state device for storing the object to be received in response to the latency requirement belonging to a third latency range.

9. One or more processor readable media storing executable instructions that, when executed by one or more processors of a storage engine, cause the one or more processors to perform acts comprising:
   receiving an object creation instruction from a client device, the object creation instruction comprising one or more object access properties of an object to be received and an object record format;
   obtaining the one or more object access properties of the object to be received;
   determining a storage device of a particular type from among storage devices of different types based at least in part on the one or more object access properties of the object to be received; and
   allocating the storage device of the particular type for storing the object to be received, wherein the object record format comprises one of a non-specific format or a fixed format, the non-specific format enabling a maximum size and a minimum size of a record of the object to be defined according to a storage specification of the storage device of the particular type, and the fixed format including information of an average physical size of the object and a variation of size of the object.

10. The one or more processor readable media of claim 9, wherein the one or more object access properties of the object to be received comprise at least one of:
   an amount of data of the object that is to be read in subsequent access requests after the object is received,
   a potential frequency range for receiving the subsequent access requests, a latency requirement for responding to the subsequent access requests, whether records of the object are read sequentially, or whether the object is to be modified within a predetermined time period from a current time.

11. The one or more processor readable media of claim 9, the acts further comprising:

receiving the object from a client device, the object comprising a plurality of records; and storing the plurality of records of the object in the storage device.

12. The one or more processor readable media of claim 11, wherein the one or more object access properties of the object to be received comprise an amount of data of the object that is to be read in subsequent access requests, and the acts further comprise:

determining whether the amount of data of the object that is to be read in the subsequent access requests is greater than or equal to a predefined read threshold, and a predefined number of individual sizes of the plurality of records of the object stored in the storage device are less than a predefined size threshold; and triggering a data merging operation on the plurality of records of the object in response to determining whether the amount of data of the object that is to be read in the subsequent access requests is greater than or equal to the predefined read threshold, and the predefined number of individual sizes of the plurality of records of the object stored in the storage device are less than the predefined size threshold.

13. The one or more processor readable media of claim 11, wherein the one or more object access properties of the object to be received comprise whether the plurality of records of the object is read sequentially, and the acts further comprise:

determining whether the plurality of records of the object is read sequentially; and in response to receiving a request for fetching a record of the plurality of the records of the object from a client device, fetching the record and further pre-fetching one or more records that follows after the record from the storage device.

14. The one or more processor readable media of claim 11, wherein the one or more object access properties of the object to be received comprise a latency requirement for responding to subsequent access requests and whether the object is to be modified within a predetermined time period from a current time, and the acts further comprise:

determining whether the latency requirement for responding to the subsequent access requests indicates a latency that is longer than a predefined latency threshold being acceptable, and whether the object is indicated to be modified within the predetermined time period from the current time; and postponing the storing of the plurality of records of the object in the storage device by a predefined amount of time from a time of receiving the object from the client device.

15. A storage engine comprising:

one or more processors; and memory storing executable instructions that, when executed by the one or more processors of a storage engine, cause the one or more processors to perform acts comprising:

obtaining one or more object access properties of an object to be received;

determining a storage device of a particular type from among storage devices of different types based at least in part on the one or more object access properties of the object to be received;

allocating the storage device of the particular type for storing the object to be received;

receiving the object from a client device, the object comprising a plurality of records; and storing the plurality of records of the object in the storage device, wherein the one or more object access properties of the object to be received comprise whether the one or more object access properties of the object to be received comprise a latency requirement for responding to subsequent access requests and whether the object is to be modified within a predetermined time period from a current time, and the method further comprises:

determining whether the latency requirement for responding to the subsequent access requests indicates a latency that is longer than a predefined latency threshold being acceptable, and whether the object is indicated to be modified within the predetermined time period from the current time; and postponing the storing of the plurality of records of the object in the storage device by a predefined amount of time from a time of receiving the object from the client device.

16. The method of claim 1, wherein the one or more object access properties of the object to be received further comprise at least one of:

an amount of data of the object that is to be read in subsequent access requests after the object is received, a potential frequency range for receiving the subsequent access requests, a latency requirement for responding to the subsequent access requests, or whether the object is to be modified within a predetermined time period from a current time.

* * * * *